United States Patent
Mendenhall et al.

(10) Patent No.: US 6,341,198 B1
(45) Date of Patent: Jan. 22, 2002

(54) SYSTEM FOR BYTE PACKING MULTIPLE DATA CHANNELS IN AN MPEG/DVD SYSTEM

(75) Inventors: Todd C. Mendenhall, San Jose, CA (US); Manabu Gouzu, Tokyo (JP)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/105,939

(22) Filed: Jun. 26, 1998

(51) Int. Cl.[7] ............................................... H04N 5/52
(52) U.S. Cl. ...................................... 386/98; 386/125
(58) Field of Search ........................... 386/95–96, 98, 386/111–112, 125; 725/36, 91, 93, 119, 138, 140, 152; 345/91; 370/397, 412, 474

(56) References Cited

U.S. PATENT DOCUMENTS

| | | | | |
|---|---|---|---|---|
| 5,544,161 A | * | 8/1996 | Bigham et al. | 725/119 |
| 5,715,356 A | * | 2/1998 | Hirayama et al. | 386/95 |
| 5,892,535 A | * | 4/1999 | Allen et al. | 725/91 |
| 6,104,861 A | * | 8/2000 | Tsukagoshi | 386/95 |
| 6,181,706 B1 | * | 1/2001 | Anderson et al. | 370/412 |

* cited by examiner

Primary Examiner—Thai Tran
Assistant Examiner—Christopher Onuaku
(74) Attorney, Agent, or Firm—Conley, Rose & Tayon

(57) ABSTRACT

A memory buffer allowing preliminary access to an upstream data portion in a data stream and a method for allowing the access. This memory buffer is a "peek-ahead" FIFO comprising a data input that receives a data stream, a data output, a circular FIFO buffer that stores data from the input at a circulating read location and provided data from a circulating write location to the data output. The memory buffer also has read and write pointers that indicate the read and write locations in the FIFO buffer. If the upstream data portion is stored in the memory buffer, the read pointer can temporarily advance by an offset number of memory locations to allow reading of the upstream data portion. In one embodiment, this memory buffer is included in a DVD decoder and is used to identify the type of an incoming packet before the entire header of the packet is processed. Also described is a method and system for parsing data words from an interleaved byte stream. The method has steps of: (a) reading a byte from the byte stream, (b) determining a type of the byte, that is—what type of data is carried in the packet that it comes from, (c) storing the byte in a word-length buffer for its type, (d) transferring the buffer to a word-write memory if the buffer is full, and (e) repeating steps (a)–(d) for subsequent bytes in the data stream.

18 Claims, 4 Drawing Sheets

SYSTEM FOR BYTE PACKING MULTIPLE DATA CHANNELS IN AN MPEG/DVD SYSTEM

BACKGROUND OF THE INVENTION

1. Field of the Invention

The invention generally relates to the field of digital communication, and particularly relates to the parsing of packets from a data stream.

2. Description of the Related Art

Digital data are generally transmitted in contiguous groups called packets. A packet in a data stream typically starts with a number of bits called a header that provides information on the packet's characteristics such as its length, the type of data it carries, and perhaps error-checking information and the destination of the data, among other characteristics. The header of a data packet is typically followed by a payload section of data, which comprises the data to be communicated by the packet. The packetization of data provides several advantages. Primary among these is the robustness of the data transfer. The finite length packets are typically independent of each other, therefore, errors in one packet do not propagate to cause errors in data from other packets. Packetization also permits multiplexing, allowing multiple users to share a single communications resource. This flexibility also allows a single data stream to carry more than one type of data. For example, some data formats in common use for the transfer of video and audio information are the MPEG standard formats (such as MPEG-1 and MPEG-2) defined by the Moving Picture Experts Group, a working group of ISO.

FIG. 1: Packetized Data Stream

FIG. 1 shows a sample data stream comprising audio and video packets from an MPEG data stream. Although this discussion particularly describes an MPEG data stream, the structure described in this figure is equally applicable to other interlaced digital data formats.

As shown in the figure, a packetized elementary stream (PES) 100 comprises a stream of audio and video PES packets. The PES data stream is thus a single data stream comprising two interlaced elementary streams (ES): an audio ES and a video ES. The PES stream comprises a series of audio PES packets and video PES packets. Each audio PES packet comprises a header portion and an audio data portion, and each video PES packet comprises a header portion and a video data portion. When read in sequence, the audio data portions can be recombined into the audio elementary stream 110. Similarly, the video data portions can be read in sequence and recombined into the video elementary stream 120. Although only two types of elementary streams (audio and video) are shown in this figure, the MPEG-2 specification provides for four different types of PES packets: MPEG video (a compressed video format), MPEG audio (a compressed audio format), private stream 1, and private stream 2. The two private streams allow the MPEG-2 definition to be used in specialized systems that communicate information other than the standard MPEG audio and video. Each of the four types of PES packets has a predefined format for its header. A parameter in the PES header, called the stream_id, identifies the packet as being one of these four types of PES packet. Thus by reading the stream_id from the PES packet header, a receiving unit may rapidly identify which type of packet is being received in the data stream, and respond accordingly. For example, in the case of an audio-video decoder that does not use the private stream 1 or private stream 2 information, a parser in the decoder may read the headers of each PES packet received in the data stream, and after identifying the packet according to its stream_id, direct the payload data so that video data portions are sent to a video buffer, audio data portions are sent to an audio buffer, and private stream 1 and private stream 2 data are discarded.

A particular technology using the MPEG-2 data format is the digital versatile disk (DVD) for optical disk storage technology. DVD storage systems have widespread use in the storage and communication of audio and video data, particularly in home entertainment use. In addition to holding MPEG audio and video, the DVD standard specifies formats other types of information, such as other types of audio streams, sub-picture information for display at the bottom of the video screen, and navigation information to enable interactive usage. These other types of information are also transferred in packets in the MPEG 2 data stream, interleaved with the MPEG audio and MPEG video data packets. The additional data are placed in custom packets of various types. There are custom data packets for Dolby AC-3 audio, DTS audio, SDDS audio, linear PCM audio, PCI data, and DSI data. In addition, other types of custom data packets are reserved for future use, such as extended sub-picture data. All these different types of custom data packets must be formatted into either private stream 1 or private stream 2 data packets to be included in an MPEG-2 PES. To distinguish among these various types of data packets, identifying information on them is included in the beginning of each data portion of the private stream data packets. This identifying information, though it is included in the data portion of the packet, effectively comprises an additional header portion for the private stream 1 and private stream 2 data packets in the DVD specification.

FIG. 2: AC-3 Audio Packet in a DVD Data Stream

An example of such a custom data packet is shown in FIG. 2. As described earlier, the first part of the packet is a private stream 1 packet header 251, and the following information is the private stream 1 data 252. The private stream 1 packet header 251 comprises a number of fields. The first field is the "packet_start_code_prefix" 201, a predefined 24 bit sequence of 23 0's followed by a trailing 1 (or in hexadecimal: 00 0001h). This unique sequence identifies the start of a PES packet, whether the PES packet is an MPEG audio, MPEG video, private stream 1 or private stream 2 packet. The next field is the stream_id 202. As shown in the following table, the stream_id uniquely identifies which of the four types of MPEG 2 packets is being received. Note that in this discussion, a number with suffix "h" is a hexadecimal number, while a "b" suffix indicates a binary number.

| stream_id | Stream coding |
|---|---|
| 110x 0nnnb | MPEG audio stream (for Decoding Audio stream number nnn) |
| 1110 0000b | Video stream |
| 1011 1101b | private_stream_1 |
| 1011 1111b | private_stream_2 |

By way of example, FIG. 2 shows the stream_id 202 to be the binary number 1011 1101b, indicating that the packet is a private stream 1 packet. The field following the stream_id 202 is the "PES_packet_length" 203, which indicates the total length of the PES packet. The following two bytes in the private stream 1 header comprise various flags 204 describing the packet. Following these flags is the "PES_header_data length" 205, which indicates the number of remaining bytes before the end of the PES header. This field is a one byte field, so in principle between 0 and 255 bytes may remain in the packet header. According to the DVD specification, however, between 8 and 15 further bytes of data would be included at the end 206 of the header for this packet. After the last byte of the private stream 1 packet header begin the private stream 1 data bytes. Note that the private stream 1 packet header has identified the packet as being a private stream 1 packet. There has been no indication in the header 251, however, of the type of data to be carried in the payload of the packet. This identification is carried in the first byte of the private stream 1 data 252: the "sub_stream_id" field 210. The sub_stream_id 210, along with other payload description at the beginning of the private stream 1 data portion 252 effectively make up a sub header 253 of additional information for the private stream 1 sub-packet.

By way of example, FIG. 2 shows a data packet carrying Dolby AC-3 audio data. Thus the one-byte sub_stream_id 210 for this field would be in the range between the hexadecimal numbers 80h and 87h, corresponding to a binary number of 10000 nnnb. The last three bits of this number represent a number between 0 and 7: the audio stream number for this audio packet. (The DVD specification allows for the interleaving of multiple alternative video tracks and multiple alternative audio tracks. Thus, a user may choose between several views for a given scene, and between several choices of audio track to accompany the scene, such as an English track, a Spanish track, or a music track, for example. The audio stream number indicates which of the eight audio streams is being carried in the current packet.)

The following table indicates some of the designated sub-stream packets and their stream_id / sub_stream_id identifiers.

| stream_id | sub_stream_id | Stream coding |
|---|---|---|
| | | private_stream_1 |
| 1011 1101b | 001* **b | Sub-picture stream (****=Decoding Sub-picture stream number) |
| 1011 1101b | 011* ****b | Reserved (for extended Sub-picture) |
| 1011 1101b | 1000 0*b | Dolby AC-3 audio stream (*=Decoding Audio stream number) |
| 1011 1101b | 1000 1*b | DTS audio stream (*=Decoding Audio stream number) |
| 1011 1101b | 1001 0*b | SDDS audio stream (*=Decoding Audio stream number) |
| 1011 1101b | 1010 0*b | Linear PCM audio stream (*=Decoding Audio stream number) |
| | | private_stream_2 |
| 1011 1111b | 0000 0000b | PCI stream |
| 1011 1111b | 0000 0001b | DSI stream |

In a DVD data stream, the sub_stream_id field 210 is the first byte of the data field in all private stream 1 and private stream 2 packets. The next two fields shown in FIG. 2 are particular to the AC-3 packets. Other header information may be present for other types of packets. The AC-3 fields of "number_of_frames_headers" 211 and "first_access_unit_pointer" 211 indicate the number of AC-3 frames contained in the AC-3 payload and the location of the start of the first AC-3 packet in the payload. Following these two fields is a block of data 254 carrying the payload AC-3 data.

As can be seen from the above discussion, if a received packet is an MPEG audio or MPEG video packet, its identity can be determined by looking at the fourth byte of the packet: the stream_id. However, for the other types of packet received in a DVD stream, the identity of the packet is not determined until the sub_stream_id byte is received. Both of these bytes are required to identify of the packet, but as can be seen in FIG. 2, they may be separated by as much as 260 intervening bytes.

This structure poses challenges for the handling of incoming data. If all of the data in an incoming packet header are to be interpreted before the purpose of the packet is ascertained, a large amount of computational power will be expended on the processing of unnecessary packets, since a data stream may comprise packets for audio streams, video streams, and other information that are not used by a particular receiver. For example, if a receiver is using a Spanish audio track to accompany a video track, it is not necessary for the receiver to process the packets for a received French audio track. It would be most efficient to quickly recognize such unnecessary packets and discard them without further processing. Thus, it would be useful to have a means for rapidly determining the identity of an incoming DVD packet before initiating processing of the packet's header data.

Another challenge imposed by the DVD data structure is the management of the various data streams. The DVD stream is typically parsed by logic components on a DVD processor chip and provided to an off-chip memory storage, such as a DRAM. This off-chip memory provides a buffer region for the various data streams which are then read separately back into the DVD processor chip for decoding and forwarding to the appropriate output units such as stereo systems and TV monitors. Some amount of memory is required on the DVD processing chip to buffer the parsed data streams before they are shipped to the off-chip memory. This on-chip memory is at a premium because it requires a large amount of "real estate" on the chip. Large on-chip memories can greatly increase the production cost a DVD processor, so efficient use of on-chip memory for rapid data-stream parsing would provide a DVD chip with practical and valuable advantages.

SUMMARY OF THE INVENTION

Accordingly, described herein is a memory buffer allowing preliminary access to an upstream data portion in a data stream. This memory buffer is a "peek-ahead" FIFO comprising a data input that receives a data stream, a data output, a circular FIFO buffer that stores data from the input at a circulating read location and provided data from a circulating write location to the data output. This memory buffer is a "peek-ahead" FIFO comprising a data input, a data output, and a circular FIFO buffer. The data input receives the data stream. The circular FIFO buffer stores data from the input at a circulating read location and provides data from a circulating write location to the data output also has read and write pointers that indicate the read and write locations in the FIFO buffer. If the upstream data portion is stored in the memory buffer, the read pointer can temporarily advance by an offset number of memory locations to allow reading of the upstream data portion. In one embodiment, this memory buffer is included in a DVD decoder and is used to identify the type of an incoming packet before the entire header of the packet is processed.

Also described is a method for parsing data words from an interleaved byte stream. The method has steps of: (a) reading a byte from the byte stream, (b) determining a type of the byte, that is—what type of data is carried in the packet that it comes from, (c) storing the byte in a word-length buffer for its type, (d) transferring the buffer to a word-write memory if the buffer is full, and (e) repeating steps (a)–(d) for subsequent bytes in the data stream.

BRIEF DESCRIPTION OF THE DRAWINGS

Other objects and advantages of the invention will become apparent upon reading the following detailed description and upon reference to the accompanying drawings in which.

Figure 1:
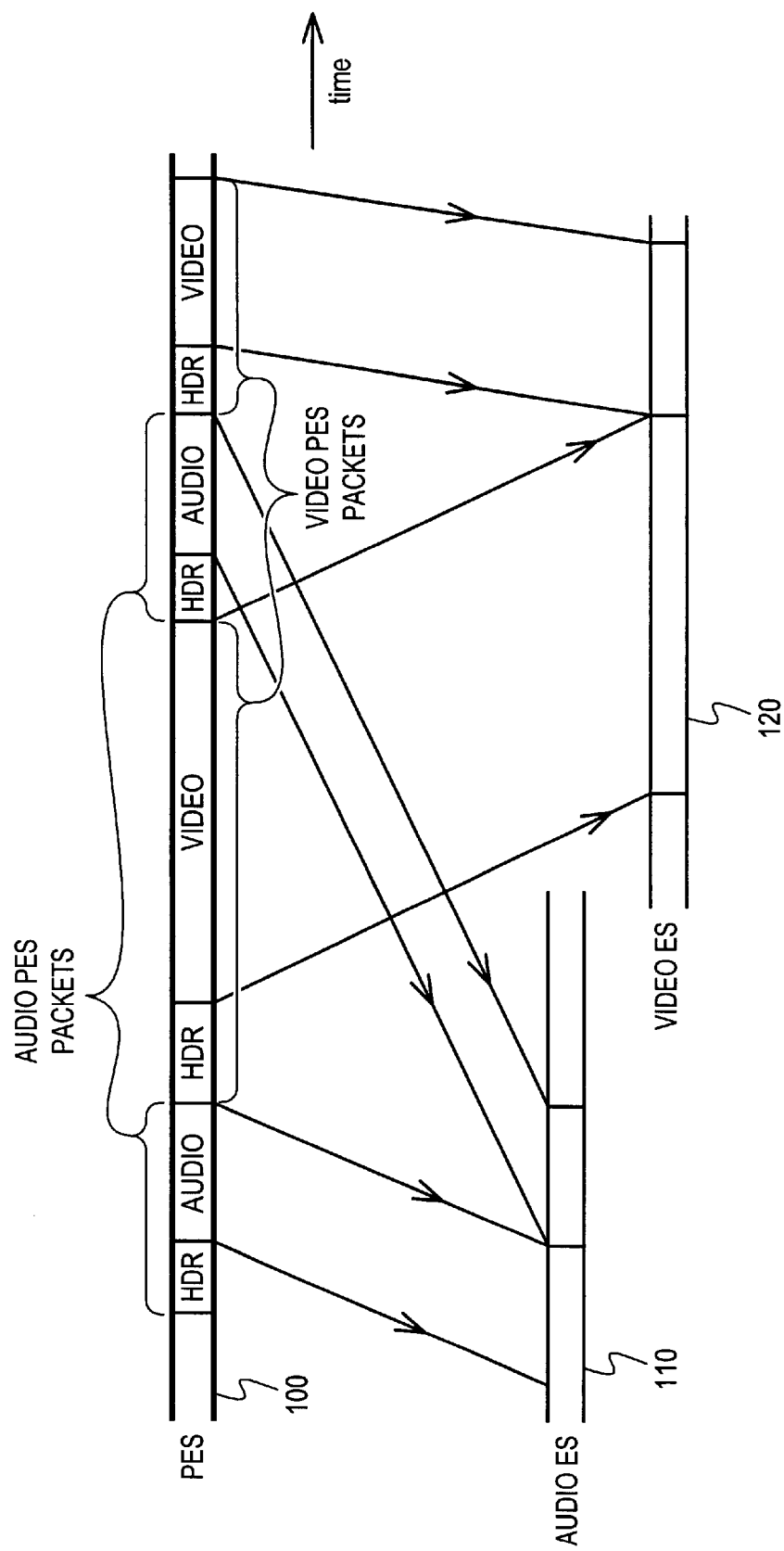
FIG. 1 shows a sample packetized elementary data stream (PES) and two elementary streams (ES) reconstructed from the PES.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
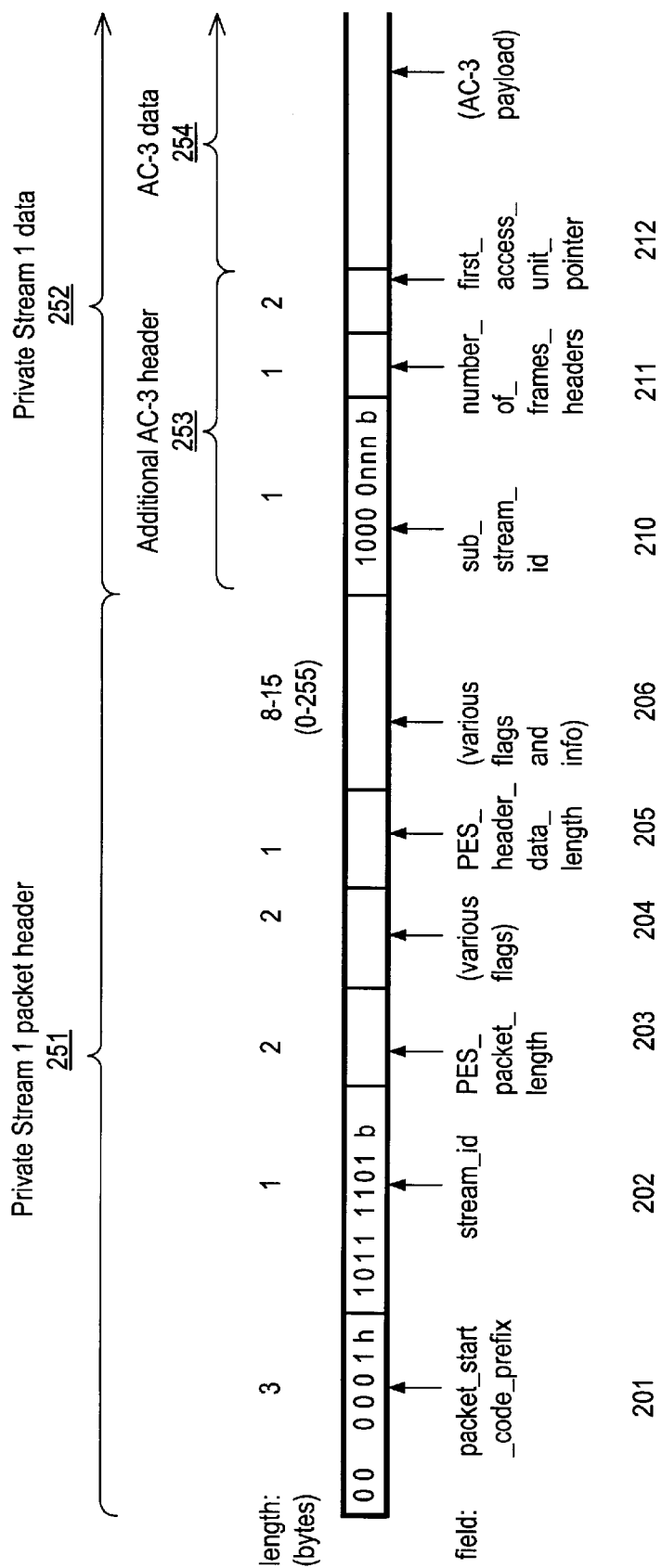
FIG. 2 shows a sample AC-3 PES packet.

Described herein is a system and method for identifying and sorting the various data streams and headers described in the foregoing discussion of FIG. 1 and FIG. 2.

Figure 3:
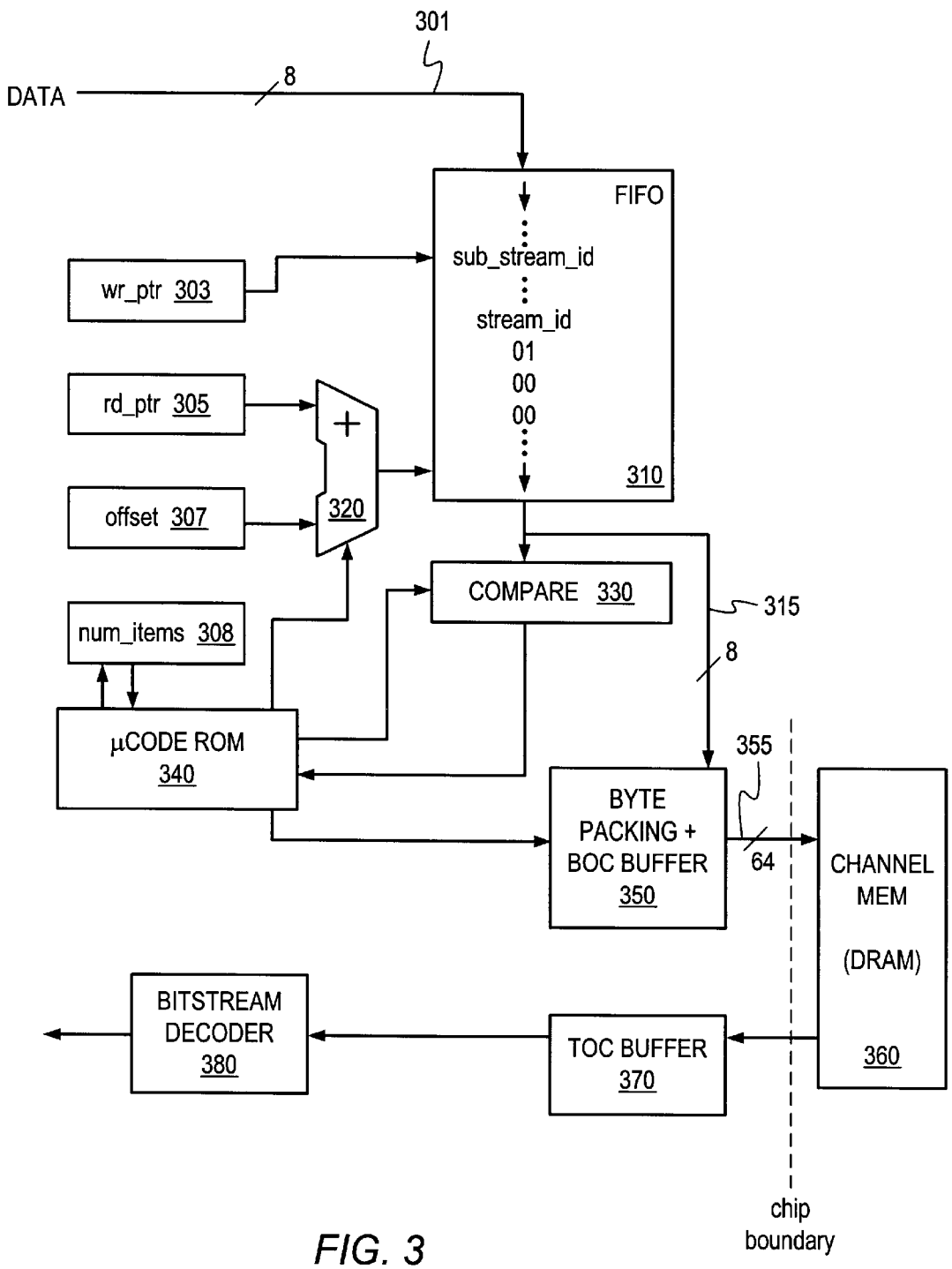
FIG. 3 is a block diagram of a DVD decoder.

FIG. 3: DVD Decoder

A block diagram of a DVD decoder is shown in FIG. 3. A FIFO 310 receives a packetized elementary stream 301 from an 8-bit wide bus. Header and payload data propagate through FIFO 310 in a manner typical of circular FIFOs. The information is written to memory locations in the FIFO and stored there until read and removed from the FIFO. The propagation of data through the FIFO is achieved by moving a read pointer 305 and a write pointer 303 sequentially through memory locations in FIFO 310. Shown by way of example in FIG. 3 is a FIFO through which an early portion of a private stream data packet is flowing. The initial bytes 00h, 00h, stream_id, and sub_stream_id, are indicated as being present in FIFO 310. The output 315 of FIFO 310 is provided to a byte-packing block and bottom of channel (BOC) buffer 350. The identity of packets being read from FIFO 310 is ascertained by a compare block 330. Compare block 330 tests whether bytes removed from FIFO 310 match any of a series of test bytes provided by micro code ROM 340. The set of test bytes is chosen by micro code ROM 340 to allow identification of packet headers being removed from FIFO 310. In a preferred embodiment, compare block 330 also performs masking functions under the control of micro code ROM 340 to more efficiently analyze data in output 315. As bytes are removed from FIFO 310, micro code ROM 340 determines their target location in BOC buffer 350 according to the type of packet in which the byte is contained.

The type of packet is determined partly in the compare operations of block 330. However, as described earlier, the initial header information immediately available to compare block 330 does not necessarily provide a full identification of the packet being retrieved from FIFO 310. The sub_stream_id byte, which may be located substantially far downstream from the initial portions of the packet header, may be required to ascertain the identity of the packet. In order to rapidly ascertain the packet identity, read pointer 305 may be redirected temporarily to the location at which sub_stream_id is located (if sub_stream_id is present in FIFO 310). This temporary shift is achieved with a shifting block 320, which adds an offset 307 to the location of read pointer 305, thereby advancing its location in the upstream direction. By reading the initial header information from FIFO 310, micro code ROM 340 can ascertain the appropriate offset 307 so that read pointer 305 is redirected to the location of the sub_stream_id. After the sub_stream_id is read, read pointer 305 is reset to its initial location by shifting block 320, which removes the additional offset 307. It should be noted that during the period in which read pointer 305 is shifted, normal read operation is not followed. That is, following a read of a memory location, the contents of the contents of the memory location are not deleted (in contrast to the situation of normal FIFO operation).

The counter 308 maintains a running count of the number of items stored in FIFO 310. This count is used to determine if the sub_stream_id byte is present in FIFO 310. Prior to the shift of read pointer 305 by offset 307, micro code ROM 340 compares the count stored in counter 308 to the desired offset. If the offset is too large, micro code ROM 340 initiates a hardware stall, in which no further data are read from FIFO 310 until a sufficient amount of information is written to the FIFO to permit the offset. Counter 308 is updated by a FIFO write control-block (not shown) that controls the entry of data 301 into FIFO 310. For each byte entered into FIFO 310, counter 308 is incremented. Counter 308 is further controlled by micro code ROM 340. Micro code ROM 340 decrements counter 308 in response to each normal read from FIFO 310.

BOC buffer 350 stores bytes from FIFO 310 until a complete word of a given data type is accumulated. Upon accumulating a complete word (preferably eight bytes) of a particular data type, that word is written through output 355 to channel memory 360. Channel memory 360 is preferably a DRAM located on a separate chip than the DVD decoder, and preferably stores the buffered data in blocks so that words for one type of data are stored together, thereby reconstructing that type's elementary stream. Channel memory 360 preferably comprises sufficient memory to compensate for temporary differences in data rate between the data supplied on data stream 301 and the data rate required by bitstream decoder 380. Top of channel (TOC) buffer 370 receives words of data from channel memory 360 as required by bitstream decoder 380. TOC buffer 370 supplies a modest-sized and fast buffer for data provided to bitstream decoder 380.

In this figure, one bit stream decoder 380 and one TOC buffer 370 are shown. These blocks represent the several bit stream decoders and TOC buffers that would be necessary for several different types of data to be received and decoded from data stream 301. In a preferred embodiment, there are three bit stream decoders and three TOC buffers, for processing of audio, video, and SPU data. The SPU (sub-picture unit) data are used for text overlays on a video display, such as subtitles and menu options in interactive systems. Bitstream decoder 380 decodes the words of data received from TOC buffer 370 and provides them to user elements such as video displays, audio processors, and other appropriate devices.

Figure 4:
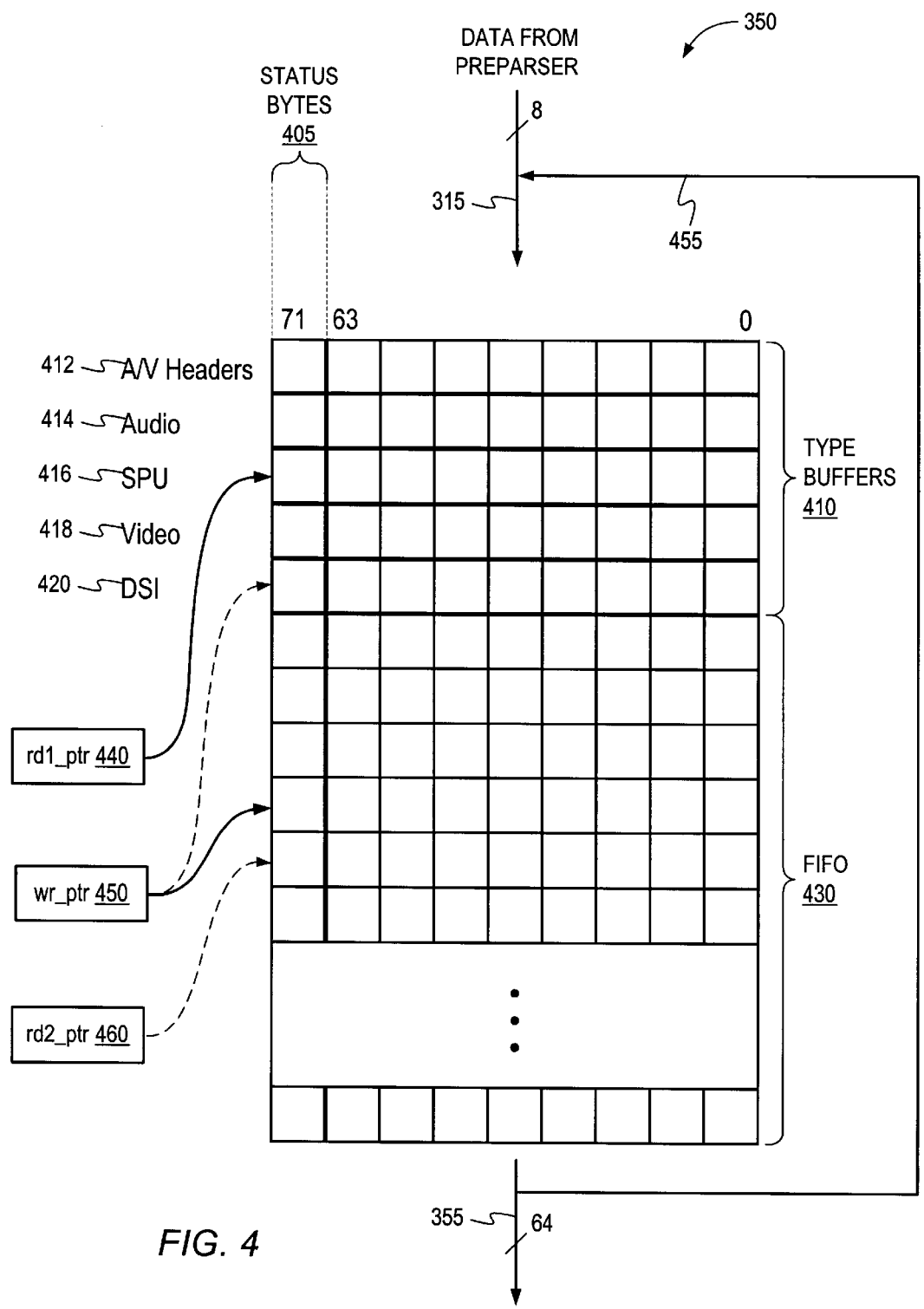
FIG. 4 is a block diagram of a bottom-of-channel (BOC) FIFO buffer.

FIG. 4: Byte Packing Block and BOC Buffer

FIG. 4 shows further detail of byte packing block and BOC buffer 350 from FIG. 3. BOC 350 comprises a "byte-write" memory. This memory is 72 bits (nine bytes) wide and the most significant byte comprises status information 405 provided by micro code ROM 340. In one embodiment, the memory unit is figured to accept word writes, and provided with nine write-enable signals controlling each of the nine bytes across the memory unit. The byte-wide data 315 is applied in parallel simultaneously to each of the nine bytes across the buffer. The write-enable signals then determine which of the corresponding bytes are loaded with the data from bus 315, thereby providing the byte-write capability of this buffer. For writes to the top part 410 of the buffer, only one write-enable signal is active at a time, leading to byte-wise writes. For writes to the bottom part 430 of the buffer, all nine write-enable signal are simultaneously active, leading to word writes. In another embodiment, the buffer is a word-write buffer, and bytes are merged into words through means external to the buffer.

The top part of the memory comprises a number of nine-byte-wide buffers. These are type buffers 410, which preferably include a buffer for audio and video headers 412, a buffer for audio data 414, a buffer for SPU data 416, a buffer for video data 418, and a buffer for DSI data 420. The write pointer 450 acts under the control of micro code ROM 340 (from FIG. 3) the location to which to indicate incoming bytes from bus 315 are written. A first read pointer 440 also acts under the control of micro code ROM 340 to read an entire word from one of the type buffers 410 if the type buffer is full after a data write. After the first read pointer 440 reads a full type buffer, that type buffer is written into the FIFO section of 430 of the memory block by write pointer 450. This capacity for reading a word from the BOC buffer 350 and writing it back into the BOC buffer 350 is indicated by the return path 455. When a nine-byte word reaches the bottom of FIFO 430 (as marked by a second read pointer 450), it is stripped of its status byte and the remaining 64 bits of data are output on bus 355 and provided to channel memory 360.

This architecture compactly provides a bottom of channel buffer through FIFO 430, while simultaneously allowing the arrangement of bytes from particular data types into words of those data types prior to export into channel memory 360.

What is claimed is:

1. A DVD player comprising:
    an input that receives interleaved data comprising N types of data, wherein N is greater than 1, and wherein the input receives the data in units of a first number of bits;
    a type-recognition block coupled to said input, wherein said type-recognition block determines a type of data received by said input;
    a parsing block coupled to said input and to said type-recognition block, wherein said parsing block comprises:
        N preliminary buffers corresponding to the N types of data, wherein said preliminary buffers are coupled to said input, and
        a FIFO buffer coupled to each of said preliminary buffers and configured to receive a second number of bits from each of said preliminary buffers;
        wherein said parsing block is operable to store data from said input into said preliminary buffers in response to the type of data received by said input so that each preliminary buffer receives a single type of data; and
        wherein each of the preliminary buffers is operable to flush the second number of bits of data to said FIFO buffer after receiving the second number of bits from said input; and
    a channel memory coupled to said FIFO, wherein the FIFO buffer outputs the second number of bits to said channel memory.

2. The DVD player of claim 1, wherein said parsing block is a bottom-of-channel buffer.

3. The DVD player of claim 1, wherein the data comprises video data and audio data, and wherein said preliminary buffers include a preliminary video buffer and a preliminary audio buffer.

4. The DVD player of claim 1, wherein the first number of bits is 8 bits.

5. The DVD player of claim 1, wherein the second number of bits is 64 bits.

6. The DVD player of claim 1, wherein said type-recognition block determines the type of data received by said input in response to header information in the data.

7. The DVD player of claim 1, wherein said preliminary buffers are each operable to store the second number of bits of data and an additional number of bits of header information.

8. The DVD player of claim 1, wherein said preliminary buffers and said FIFO buffer are comprised in a single memory block.

9. The DVD player of claim 1, wherein said channel memory is a DRAM chip.

10. A data parsing block comprising:
    an input that receives data blocks comprising a first number of bits, wherein each data block comprises one of N types of data;
    a type indicator that determines the type of the data in the data blocks;
    N preliminary buffers corresponding to the N types of data, wherein said preliminary buffers are coupled to said input and to said type indicator;
    a FIFO buffer coupled to each of said preliminary buffers, the FIFO buffer configured to receive data words comprising a second number of bits from each of said preliminary buffers, and configured to store type information for the data words;
    wherein said preliminary buffers are operable to store data from said input into said preliminary buffers in response to the type of data so that each preliminary buffer receives a single type of data; and
    wherein each of the preliminary buffers is operable to flush the second number of bits of data to said FIFO buffer after receiving the second number of bits from said input.

11. A method for parsing data words from an interleaved data stream, the method comprising:
    receiving data from a data stream at an input of a parsing block, wherein the data is received in data blocks comprising a first number of bits, and wherein each data block comprises one of N types of data;
    determining the type of data in the data blocks using a type indicator, wherein the type indicator is coupled to the input of the parsing block;
    storing the data blocks in a data buffer, the data buffer including N preliminary buffers, wherein each of the N preliminary buffers corresponds to one of the N types of data, wherein the data is stored in the preliminary buffers in response to the type of data so that each preliminary buffer receives a single type of data; and
    transferring a second number of bits from the data buffer to a FIFO memory, wherein the second number of bits comprises a complete data word, and wherein the FIFO memory is configured to store type information for the complete data word.

12. The method as recited in claim 11 further comprising repeating said receiving, said determining, said storing, and said transferring.

13. The method as recited in claim 12 further comprising the FIFO memory transferring the second number of data bits to a channel memory.

14. The method as recited in claim 12, wherein the data stream is a DVD data stream.

15. The method as recited in claim 12 further comprising receiving header information from the data stream prior to said reading, wherein said determining is performed responsive to said receiving header information.

16. The method as recited in claim 12, wherein the data stream comprises interleaved video data and audio data.

17. The method as recited in claim 12, wherein said reading comprises reading one byte of data from the data stream.

18. The method as recited in claim 17, wherein a data word comprises 8 bytes of data, and wherein said transferring comprises transferring 8 bytes of data from the data buffer to the FIFO memory.

* * * * *